United States Patent [19]
Matsumoto et al.

[11] Patent Number: 5,966,273
[45] Date of Patent: Oct. 12, 1999

[54] MAGNETORESISTIVE THIN FILM HEAD

[75] Inventors: Hidetoshi Matsumoto; Hiroshi Tomiyasu, both of Kumamoto-ken, Japan

[73] Assignee: Matsushita Electric Industrial Co., Ltd., Osaka, Japan

[21] Appl. No.: 08/187,328

[22] Filed: Jan. 26, 1994

[30]    Foreign Application Priority Data

Jan. 26, 1993  [JP]  Japan .................................. 5-010957

[51] Int. Cl.$^6$ .................................................. G11B 5/39
[52] U.S. Cl. ........................................................ 360/113
[58] Field of Search .................................. 360/113, 119, 360/120, 125, 126; 428/694, 900; 29/603

[56]            References Cited

U.S. PATENT DOCUMENTS

| | | | |
|---|---|---|---|
| 4,391,846 | 7/1983 | Raymond | 427/99 |
| 4,616,281 | 10/1986 | Nakamura | 360/113 |
| 4,663,607 | 5/1987 | Kitada et al. | 360/113 |
| 4,914,538 | 4/1990 | Howard et al. | 360/113 |
| 4,982,068 | 1/1991 | Pollock et al. | 392/488 |
| 5,173,760 | 12/1992 | Min et al. | 257/378 |
| 5,250,327 | 10/1993 | Ogata et al. | 427/528 |
| 5,258,206 | 11/1993 | Hayashi et al. | 427/577 |
| 5,266,409 | 11/1993 | Schmidt et al. | 428/446 |

FOREIGN PATENT DOCUMENTS

| | | | |
|---|---|---|---|
| 521442 | 1/1993 | European Pat. Off. | 360/113 |
| 62-33317 | 2/1987 | Japan . | |
| 268706 | 3/1990 | Japan . | |
| 4-31409 | 3/1992 | Japan . | |

*Primary Examiner*—David L. Ometz
*Attorney, Agent, or Firm*—Lowe Hauptman Gopstein Gilman & Berner

[57]              ABSTRACT

In a magnetoresistive thin film head including a magnetoresistive element, lead layers for supplying a sense current to the magnetoresistive element and an insulating layer provided in the vicinity of the magnetoresistive element, the insulating layer is formed of a material which has an electrical resistivity greater than $1\times10^4$ Ωcm and a thermal conductivity greater than 100 W/(mK). The insulating layer may be formed of silicon, diamond-like carbon or the like so as to have an electrical resistivity and a thermal conductivity within the ranges defined above.

9 Claims, 7 Drawing Sheets

MAGNETORESISTIVE THIN FILM HEAD

BACKGROUND OF THE INVENTION

1. Field of the Invention

The present invention relates to a magnetoresistive thin film head for use in, for example, a magnetic recording/reproducing device, such as, a magnetic disk unit.

2. Description of the Prior Art

A magnetoresistive thin film head (hereinafter also referred to as "MR head"), which is capable of reading out data recorded on a magnetic recording medium, such as, a magnetic disk, has been known as disclosed in, such as, Japanese Unexamined Patent Publication No. 2-68706.

Figure 9:
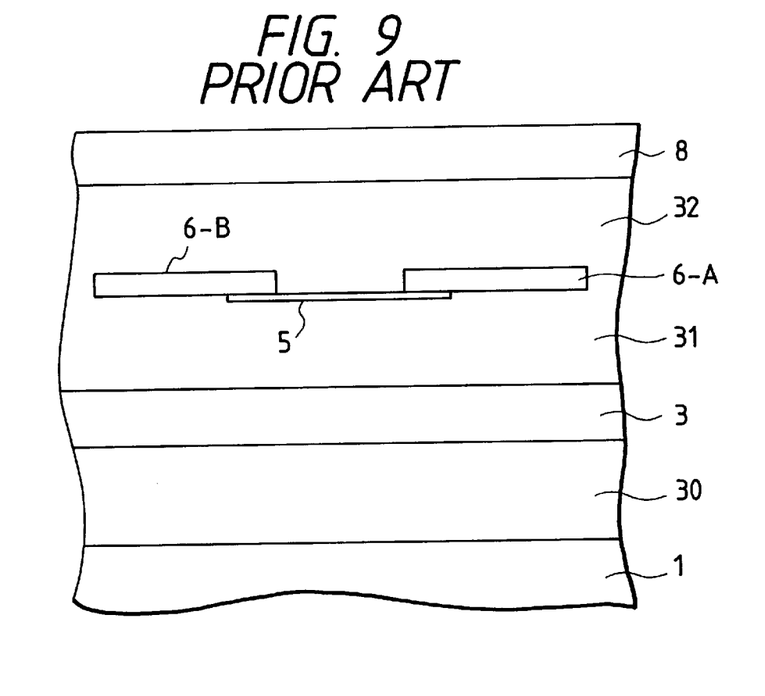
FIG. 9 is a schematic partial front view showing a conventional MR head.

FIG. 9 is a schematic partial front view showing a main portion of a conventional MR head. In FIG. 9, the MR head includes a substrate 1, and further includes an insulating film or layer 30, a shield film or layer 3, an insulating film or layer 31, a magnetoresistive element layer (hereinafter also referred to as "MR element layer") 5, lead films or layers 6-A and 6-B, an insulating film or layer 32 and a shield film or layer 8 which are stacked on the substrate 1 in the order named.

Figure 10:
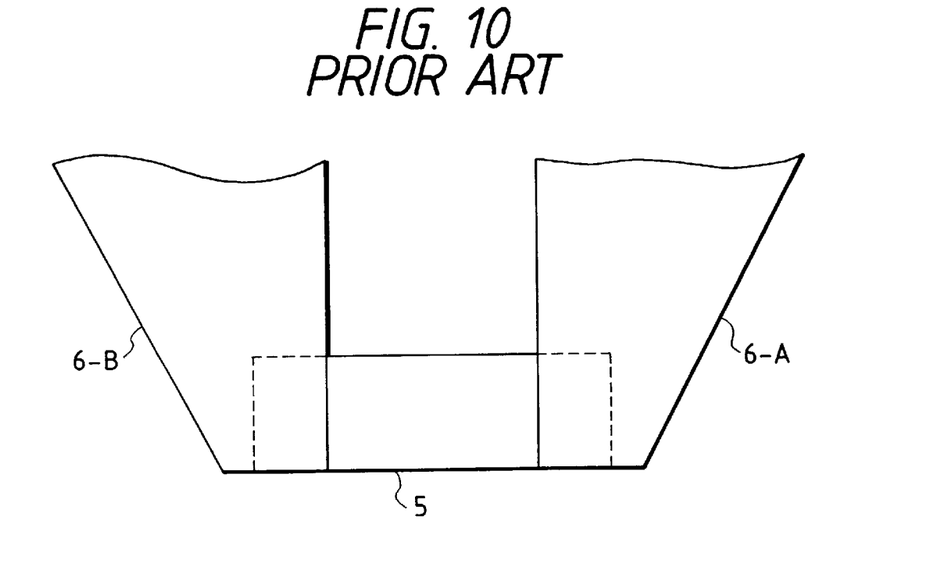
FIG. 10 is a schematic partial plan view showing a positional arrangement of an MR element layer and lead layers of the conventional MR head as shown in FIG. 9.

FIG. 10 is a schematic partial plan view showing the MR element layer 5 and the lead layers 6-A and 6-B. In FIG. 10, the lead layers 6-A and 6-B are connected to opposite ends of the MR element layer 5 of a rectangular shape, respectively.

Figure 11:
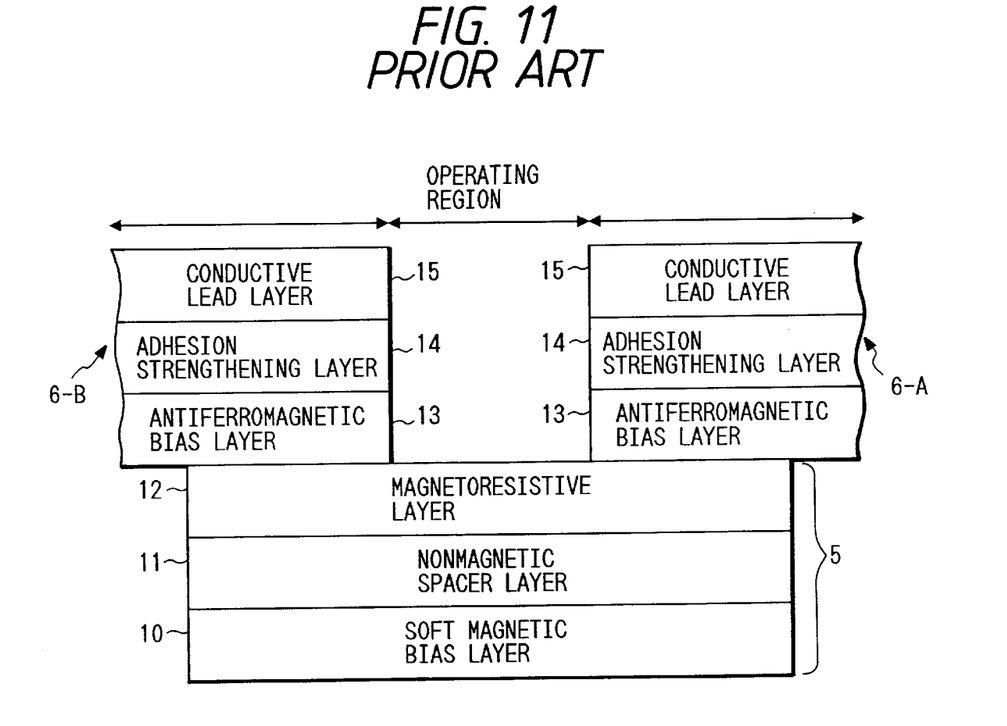
FIG. 11 is a diagram for explaining structures of the MR element layer and the lead layers of the conventional MR head as shown in FIG. 9.

FIG. 11 is a diagram showing the MR element layer 5 and the lead layers 6-A and 6-B in more detail. In FIG. 11, the MR element layer 5 is formed by a soft magnetic bias film or layer 10, a nonmagnetic intermediate spacer film or layer 11 and a magnetoresistive film or layer 12 formed of a material showing a magnetoresistance effect. The soft magnetic bias layer 10 is provided for applying a bias magnetic field to the magnetoresistive layer 12, the nonmagnetic intermediate spacer layer 11 is provided for magnetically separating the soft magnetic bias layer 10 and the magnetoresistive layer 12 from each other, and the magnetoresistive layer 12 is provided for converting a magnetic flux variation to an electrical signal.

The lead layers 6-A and 6-B are the same in structure with each other, each being formed by an antiferromagnetic bias film or layer 13, an adhesion strengthening film or layer 14 and a conductive lead film or layer 15. The antiferromagnetic bias layer 13 is provided for applying a magnetic exchange bias to an upper side of the magnetoresistive layer 12 in a flow direction of an energization current or a sense current.

Operations of the foregoing conventional MR head will be described hereinbelow.

When the sense current flows from the lead layer 6-A to the lead layer 6-B via the MR element layer 5, which then returns to a power supply, a magnetic field is generated in a direction perpendicular to the flow direction of the sense current due to the sense current flowing in the MR element layer 5. Accordingly, the magnetoresistive layer 12 and the soft magnetic bias layer 10 are magnetized such that the magnetization in the magnetoresistive layer 12 is biased or directed in a direction perpendicular to the flow direction of the sense current due to an effect of coupling between the magnetoresistive layer 12 and the soft magnetic bias layer 10.

When an external magnetic field is applied to the biased magnetoresistive layer 12, the magnetoresistive layer 12 linearly changes its electric resistance depending on a variation of the applied external magnetic field so that, by processing this resistance variation of the magnetoresistive layer 12 as an electrical signal, a required output can be reliably attained, that is, a magnetic field recorded on the magnetic recording medium representing the recorded magnetic data on the magnetic recording medium can be read out reliably.

Since, as described above, the magnetoresistive layer 12 of the MR element layer 5 works as an electric resistor, the MR element layer 5 is heated due to the sense current flowing through the magnetoresistive layer 12. The generated heat is radiated to the shield layers 3, 8 and to the substrate 1 via the lead layers 6-A and 6-B and the insulating layers 30, 31 and 32.

As described above, in order to operate the MR head, it is necessary that the sense current be arranged to flow in the MR element layer 5. An allowable maximum value of the sense current is determined in view of durability of the MR element layer 5 when being energized. Specifically, since a thickness of the MR element layer 5 is normally only no more than 0.1 μm, even a slight heating value causes the MR element layer 5 to be fused, leading to rupture of the MR head.

In order to avoid such an incident, it is necessary to reduce the heating value to be generated or improve the heat radiation effect.

In the conventional MR head, however, the heat radiation effect is poor due to a material forming the insulating layers so that the MR element layer 5 is likely to be damaged even with the slight heating value, and thus, an allowable maximum value of the sense current should be inevitably set small. Since the MR element layer 5 is subject to breakage when the sense current over this small allowable maximum value flows therethrough, the conventional MR head is defective in view of reliability.

SUMMARY OF THE INVENTION

Therefore, it is an object of the present invention to provide an improved magnetoresistive thin film head.

According to one aspect of the present invention, a magnetoresistive thin film head comprises a magnetoresistive element; lead means for supplying a sense current to the magnetoresistive element; and an insulating layer provided in the vicinity of the magnetoresistive element, the insulating layer being formed of a material which has an electrical resistivity greater than $1 \times 10^4$ Ωcm and a thermal conductivity greater than 100 W/(mK).

The insulating layer may be formed of silicon or diamond-like carbon.

According to another aspect of the present invention, a magnetoresistive thin film head comprises a substrate; a first shield layer disposed on the substrate; a first insulating layer disposed on the first shield layer; a magnetoresistive element film disposed on the first insulating layer; lead layers disposed on the first insulating layer for supplying a sense current to the magnetoresistive element film; a second insulating layer disposed on the first insulating layer so as to cover the magnetoresistive element film; and a second shield layer disposed on the second insulating layer, each of the first and second insulating layers being formed of a material which has an electrical resistivity greater than $1 \times 10^4$ Ωcm and a thermal conductivity greater than 100 W/(mK).

Each of the first and second insulating layers may be formed of silicon or diamond-like carbon.

The magnetoresistive thin film head may be provided with a recording element section for recording data on a magnetic recording medium.

The recording element section comprises the second shield layer, a gap layer provided on the second shield layer, an upper core provided on the gap layer so as to form a magnetic circuit with the second shield layer, and a coil layer provided between the second shield layer and the upper core for supplying a magnetic flux to the second shield layer and the upper core.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Now, preferred embodiments of the present invention will be described hereinbelow with reference to the accompanying drawings.

Figure 1:
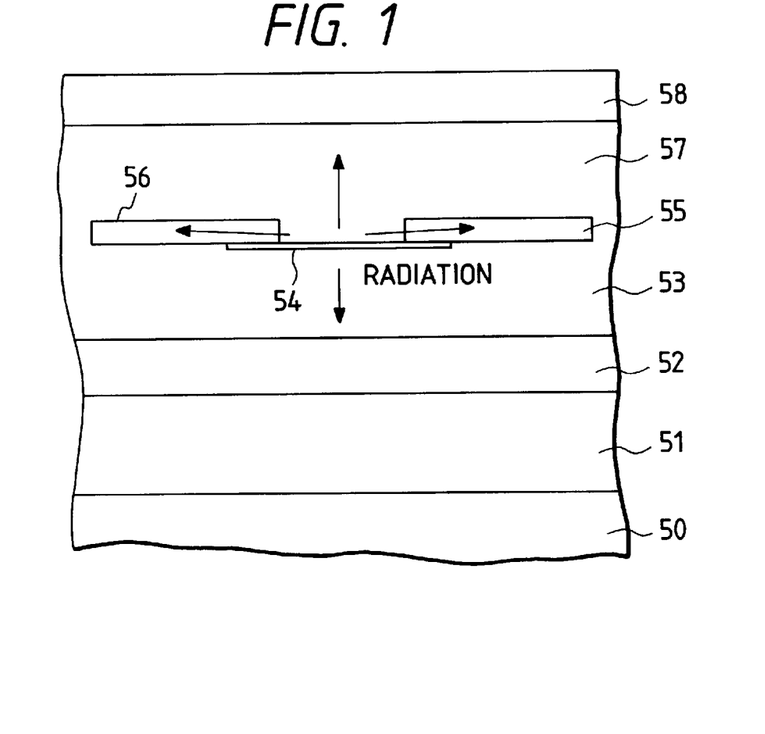
FIG. 1 is a schematic partial front view showing a layered structure of an MR head according to a first preferred embodiment of the present invention.

FIG. 1 is a schematic partial front view showing a layered structure of an MR head according to a first preferred embodiment of the present invention.

Figure 2:
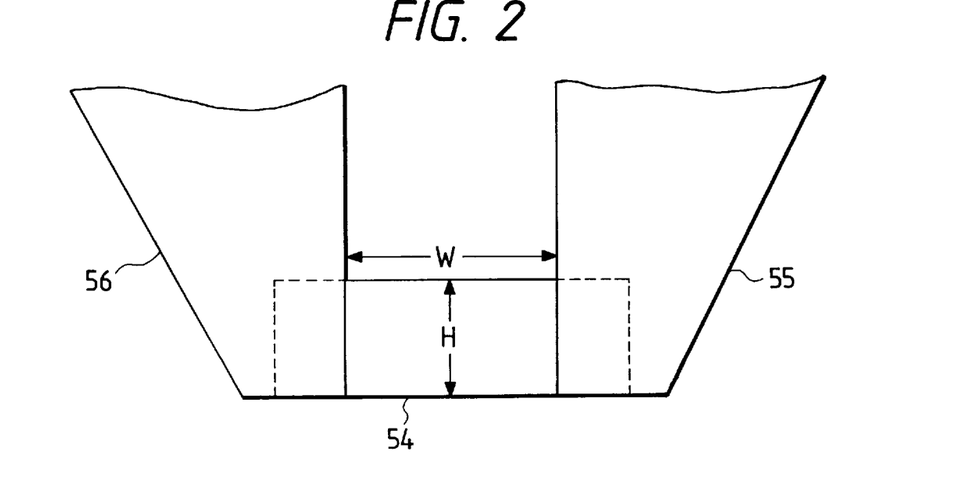
FIG. 2 is a schematic partial plan view showing a positional arrangement of an MR element layer and lead layers of the MR head as shown in FIG. 1.

In FIG. 1, numeral 50 denotes a substrate, numeral 51 an insulating film or layer disposed on the substrate 50, numeral 52 a shield film or layer formed of a soft magnetic material and disposed on the insulating layer 51, numeral 53 an insulating film or layer disposed on the shield layer 52, numeral 54 an MR element film or layer disposed on the insulating layer 53, numerals 55 and 56 lead films or layers coupled to opposite ends of the MR element layer 54 of a rectangular shape as shown in FIG. 2 for supplying a sense current to the MR element layer 54, numeral 57 an insulating layer disposed as covering the MR element layer 54 and the lead layers 55 and 56, and numeral 58 a shield layer formed of a soft magnetic material and disposed on the insulating layer 57.

Figure 3:
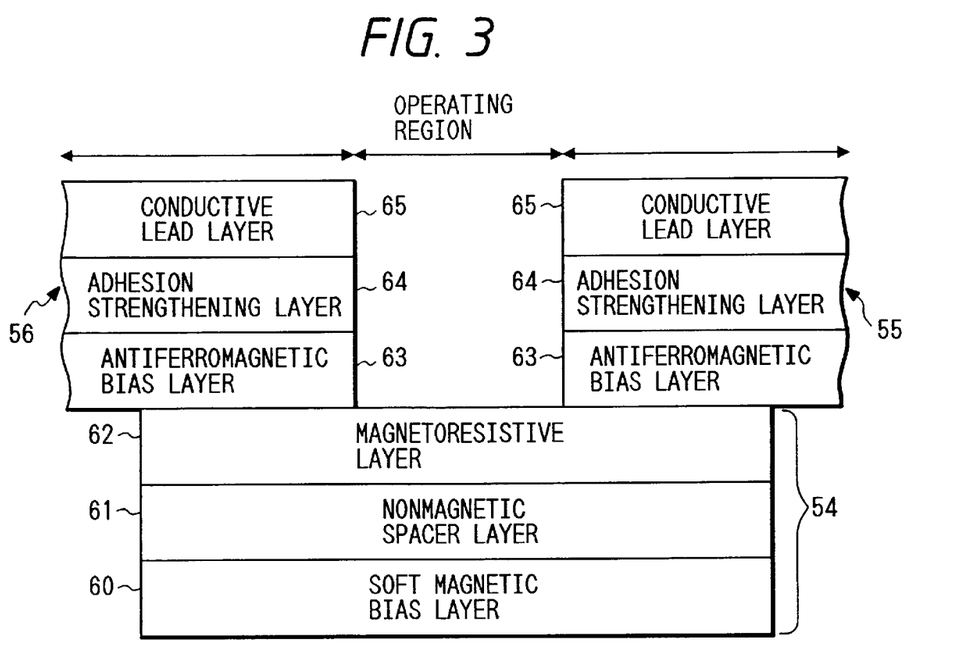
FIG. 3 is a diagram for explaining structures of the MR element layer and the lead layers of the MR head as shown in FIG. 1.

FIG. 3 is a diagram showing the MR element layer 54 and the lead layers 55 and 56 in more detail. In FIG. 3, the MR element layer 54 is formed by a soft magnetic bias film or layer 60, a nonmagnetic intermediate spacer film or layer 61 and a magnetoresistive film or layer 62 formed of a material showing a magnetoresistance effect. The soft magnetic bias layer 60 is provided for applying a bias magnetic field to the magnetoresistive layer 62, the nonmagnetic intermediate spacer layer 61 is provided for magnetically separating the soft magnetic bias layer 60 and the magnetoresistive layer 62 from each other, and the magnetoresistive layer 62 is provided for converting a magnetic flux variation to an electrical signal.

The lead layers 55 and 56 are the same in structure with each other, each being formed by an antiferromagnetic bias film or layer 63, an adhesion strengthening film or layer 64 and a conductive lead film or layer 65. The antiferromagnetic bias layer 63 is provided for applying a magnetic exchange bias to an upper side of the magnetoresistive layer 62 in a flow direction of an energization current or a sense current.

As appreciated, the three-layered structures of the MR element layer 54 and of each of the lead layers 55 and 56 shown in FIG. 3 are the same as those shown in FIG. 11.

In this preferred embodiment, each of the insulating layers 51, 53 and 57 is formed of a material having the following properties:

Electrical Resistivity>$1\times10^4$ Ωcm

Thermal Conductivity>100 W/(mK)

Since each of the insulating layers 51, 53 and 57 is formed of the material having the electrical resistivity and the thermal conductivity as defined above, the heat generated in the MR element layer 54 is effectively radiated to the exterior so that the MR element layer 54 is not damaged, i.e. not fused to disconnection.

In general, when considering only the thermal radiation effect, it is sufficient to consider only the thermal conductivity. However, in the MR head, since it is preferable to keep the MR element layer 54 in an electrically insulated condition relative to its upper and lower layers, the electrical resistivity should also be considered.

When the thermal conductivity is no more than 100 W/(mK), the MR element layer 54 is likely to be fused to disconnection with the sense current over the allowable maximum value which is very small. On the other hand, when the electrical resistivity is no more than $1\times10^4$ Ωcm, noise is generated due to current leak.

As a specific material for the insulating layers 51, 53 and 57, silicon (Si), diamond-like carbon or the like is used. However, these materials change their thermal conductivities and electrical resistivities depending on, for example, film forming conditions, such as, a gas pressure, an applied voltage, and material and quantity of an additive agent. Accordingly, the insulating layers 51, 53 and 57 are formed of Si, diamond-like carbon or the like by adjusting those conditions so that their thermal conductivities and electrical resistivities fall within the foregoing ranges, respectively.

In this preferred embodiment, the thermal conductivity and the electrical resistivity of each of the insulating layers 51, 53 and 57 is limited to within the foregoing ranges. However, the thermal conductivity and the electrical resistivity of at least one of the insulating layers 53 and 57, which are in direct abutment with the MR element layer 54, may be limited to within the foregoing ranges. Still in this case, the heat radiation effect is improved in comparison with the conventional MR head.

TABLE 1 shows the thermal conductivities and the electrical resistivities of the conventional insulating layers formed of alumina and $SiO_2$, respectively, and of the insulating layers formed of Si and diamond-like carbon according to this preferred embodiment. TABLE 1 further shows the allowable maximum sense current values for the conventional MR head having the conventional insulating layers and for the MR head having the insulating layers according to this preferred embodiment.

TABLE 1

| Material | Thermal Conductivity [W/(mK)] | Electrical Resistivity [Ωcm] | Allowable Maximum Sense Current Value [mA] |
|---|---|---|---|
| alumina | 30 | $>10^{14}$ | 15 |
| $SiO_2$ | 0.9 | $>10^{14}$ | 10 |
| Si | 168 | $2.3 \times 10^4$ | 30 |
| diamond-like carbon | ~240 | $>10^{14}$ | 30 |

As seen from TABLE 1, the Si film and the diamond-like carbon film formed by adjusting the foregoing conditions and the like have the electrical resistivities and the thermal conductivities within the foregoing ranges.

The allowable maximum sense current values in TABLE 1 have been attained on the following conditions:

In each of the four examples, the MR element layer has a thickness of 700 Å (soft magnetic bias layer: 200 Å, nonmagnetic spacer layer: 200 Å, magnetoresistive layer: 300 Å), a track width W (see FIG. 2) of 3 μm and a height H (see FIG. 2) of 2 μm. A thickness of each of the insulating layers covering the MR element layer is 0.5 μm. The conductive lead layer of each of the lead layers is formed of gold, and a thickness of each of the lead layers is 1500 Å (antiferromagnetic bias layer: 300 Å, adhesion strengthening layer: 100 Å, conductive lead layer: 1100 Å). These layers are stacked on the substrate so as to form the MR head to be used for experiment. The substrate is formed of $Al_2O_3TiC$.

As seen from TABLE 1, the Si film and the diamond-like carbon film, which are only examples according to this preferred embodiment, each can allow the sense current to flow in the MR element layer at a magnitude which is twice to three times as large as that allowed by the conventional insulating films, such as, the alumina film and the $SiO_2$ film. In TABLE 1, the allowable maximum sense current value represents a value of the sense current which fuses the MR element layer to disconnection. More specifically, the allowable maximum sense current value is determined as a value when the MR element layer is fused to disconnection by gradually increasing a magnitude of the sense current flowing in the MR element layer.

Now, a method of forming the Si film to be used as the insulating layer will be described hereinbelow.

Figure 4:
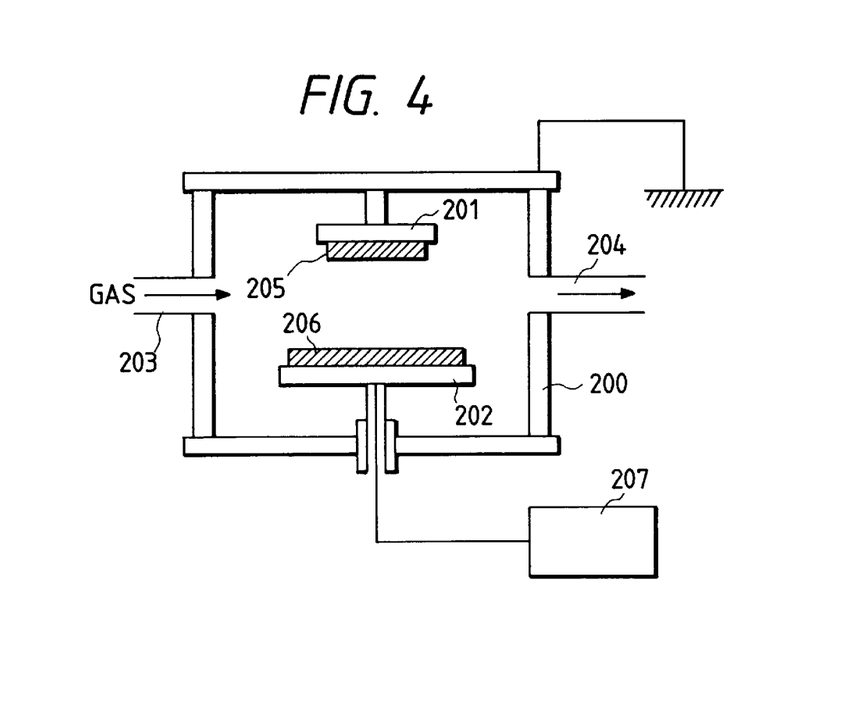
FIG. 4 is a schematic diagram showing an RF magnetron sputtering apparatus.

FIG. 4 is a diagram schematically showing a known RF magnetron sputtering apparatus.

In FIG. 4, numeral 200 denotes a chamber in which a pair of electrodes 201 and 202 are arranged in a confronting manner. Further, the chamber 200 is provided with a gas introducing hole 203 through which Ar gas is introduced into the chamber 200, and a gas suction hole 204 connected to, such as, a vacuum pump (not shown). The chamber 200 is grounded. A substrate 205 is attached to the electrode 201 while a target 206 formed of Si is attached to the electrode 202. Further, a high frequency power supply 207 is connected to the electrode 202.

When this RF magnetron sputtering apparatus is activated, sputtering particles are forced out from the target 206 onto the substrate 205 so as to form the Si film thereon. By changing, such as, a distance between the substrate 205 and the target 206, the properties of the Si film, such as, the electrical resistivity thereof can be adjusted in the known manner.

Now, a method of forming the diamond-like carbon film to be used as the insulating layer will be described hereinbelow.

Figure 5:
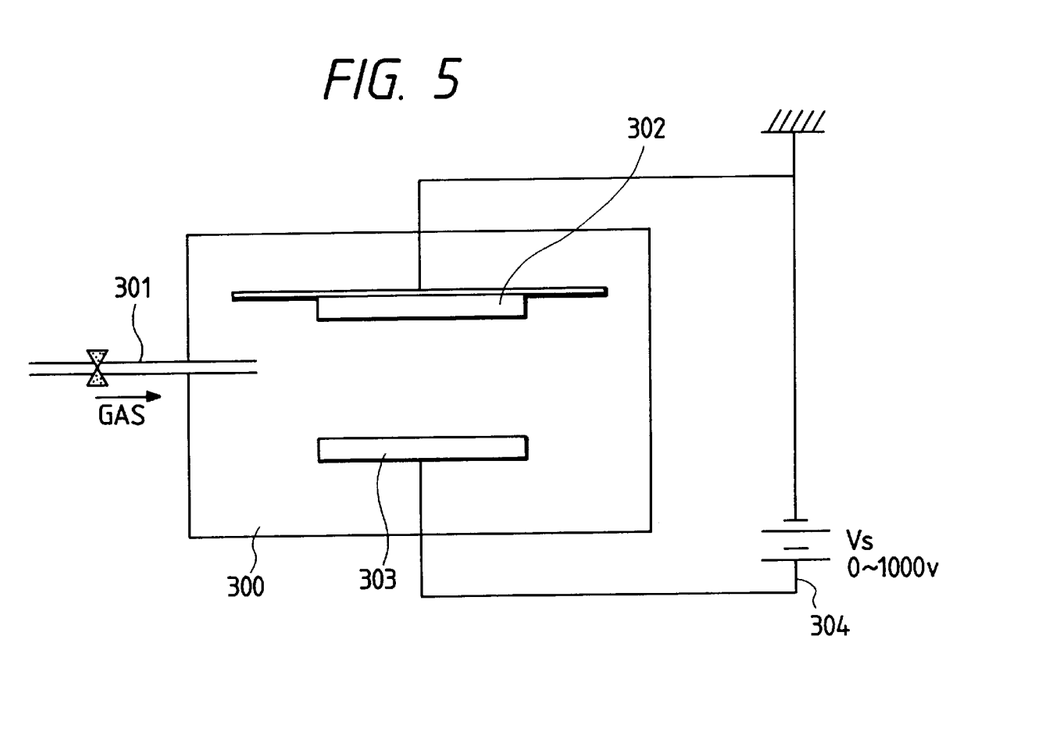
FIG. 5 is a schematic diagram showing a CVD (chemical vapor deposition) apparatus.

FIG. 5 is a diagram schematically showing a known CVD (chemical vapor deposition) apparatus.

In FIG. 5, numeral 300 denotes a chamber, numeral 301 a gas introducing conduit connected to the chamber 300, numeral 302 a substrate disposed in the chamber 300, numeral 303 an anode disposed in the chamber 300 so as to confront the substrate 302, and numeral 304 a power supply for applying a voltage between the substrate 302 and the anode 303.

With this structure, a vacuum pump (not shown) is first used to provide a predetermined degree of vacuum in the chamber 300. Thereafter, $CH_4$ gas or a mixture of $CH_4$ gas and at least one of $H_2$ gas and Ar gas is introduced into the chamber 300 via the gas introducing conduit 301 so as to fill up the chamber 300 with the introduced gas. Thereafter, the introduced gas is ionized by applying a DC voltage between the substrate 302 and the anode 303 using the power supply 304. Since ionized C (carbon) is charged with a positive electricity so as to be attracted to the substrate 302 working as a negative electrode, the diamond-like carbon film can be formed on the substrate 302.

Figure 6:
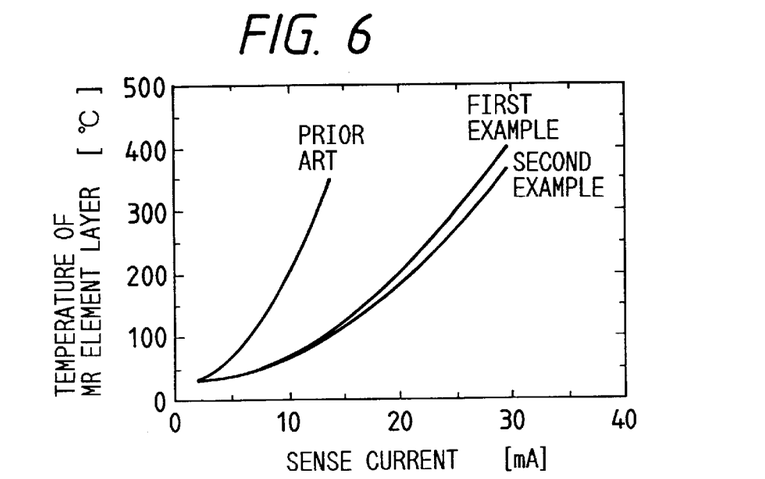
FIG. 6 is a graph showing a relationship between a magnitude of a sense current and temperatures of MR element layers.

FIG. 6 is a graph showing a relationship between a magnitude of the sense current and temperatures of the MR element layers, wherein the alumina films are used as the insulating layers covering the MR element layer for a characteristic line labeled by "prior art", the Si films are used as the insulating layers covering the MR element layer for a characteristic line labeled by "first example", and the diamond-like carbon films are used as the insulating layers covering the MR element layer for a characteristic line labeled by "second example".

The characteristic lines in FIG. 6 have been attained on the following conditions:

In each of the three examples, the MR element layer has a thickness of 700 Å (soft magnetic bias layer: 200 Å, nonmagnetic spacer layer: 200 Å, magnetoresistive layer: 300 Å), a track width W (see FIG. 2) of 3 μm and a height H (see FIG. 2) of 2 μm. A thickness of each of the insulating layers covering the MR element layer is 0.5 μm. The conductive lead layer of each of the lead layers is formed of gold, and a thickness of each of the lead layers is 1500 Å (antiferromagnetic bias layer: 300 Å, adhesion strengthening layer: 100 Å, conductive lead layer: 1100 Å). These layers are stacked on the substrate so as to form the MR head to be used for experiment. The substrate is formed of $Al_2O_3TiC$. Each characteristic line is derived such that resistance values of the MR element layer are first derived by changing magnitudes of the sense current flowing in the MR element layer via the lead layers, and thereafter, temperatures of the MR element layer are derived as substitute values of the derived resistance values.

As seen from FIG. 6, the MR heads of "first and second examples" each provide the highly improved heat radiation effect in comparison with the MR head of "prior art".

As appreciated, each of the insulating layers used in "first and second examples" in FIG. 6 satisfies the following conditions:

Electrical Resistivity>1×10$^4$ Ωcm

Thermal Conductivity>100 W/(mK)

Now, a second preferred embodiment of the present invention will be described with reference to FIGS. 7 and 8, wherein an MR head includes a recording head element for recording data on a magnetic recording medium M.

Figure 7:
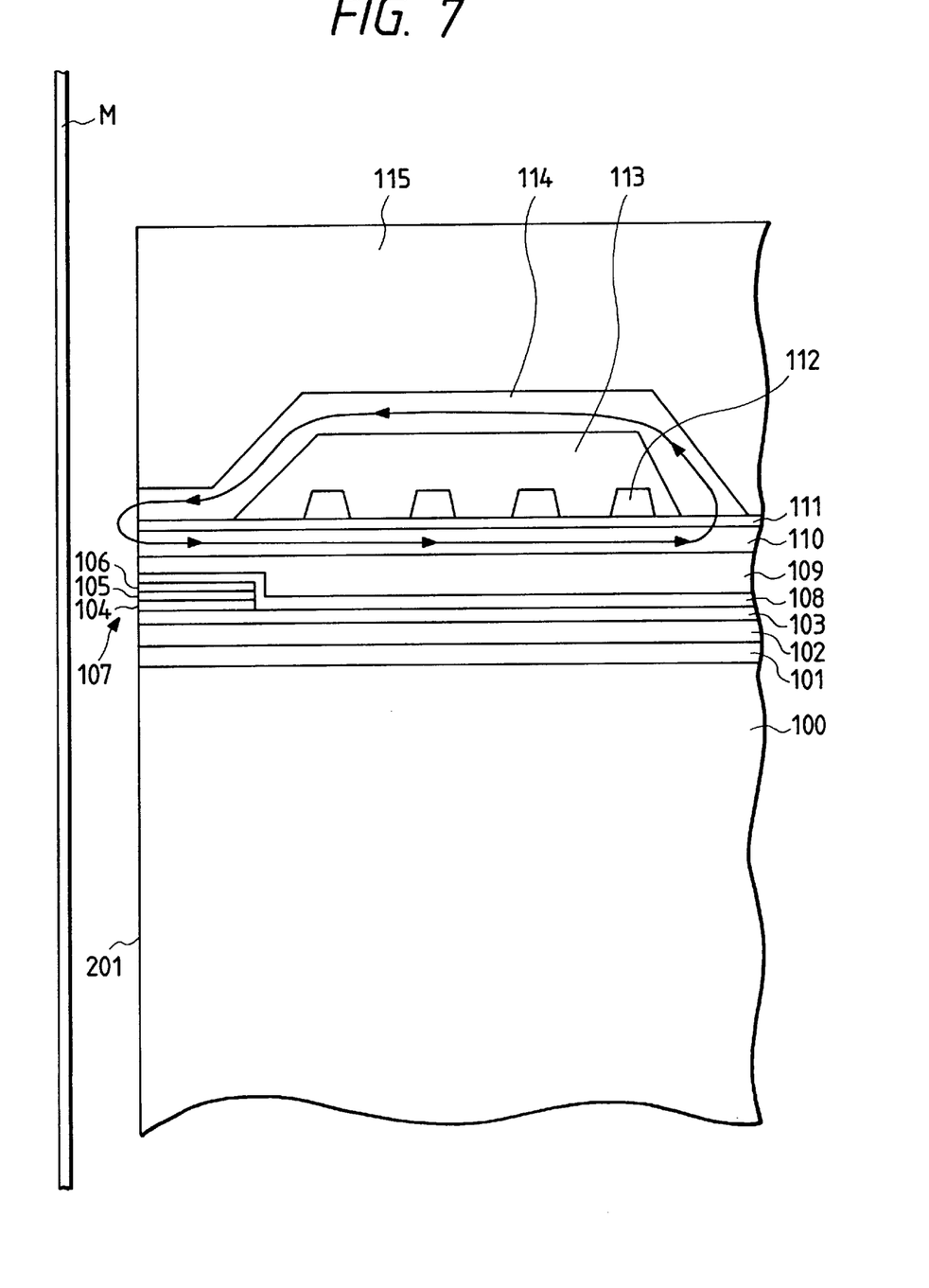
FIG. 7 is a schematic partial sectional view of an MR head with a recording head element, according to a second preferred embodiment of the present invention.
Figure 8:
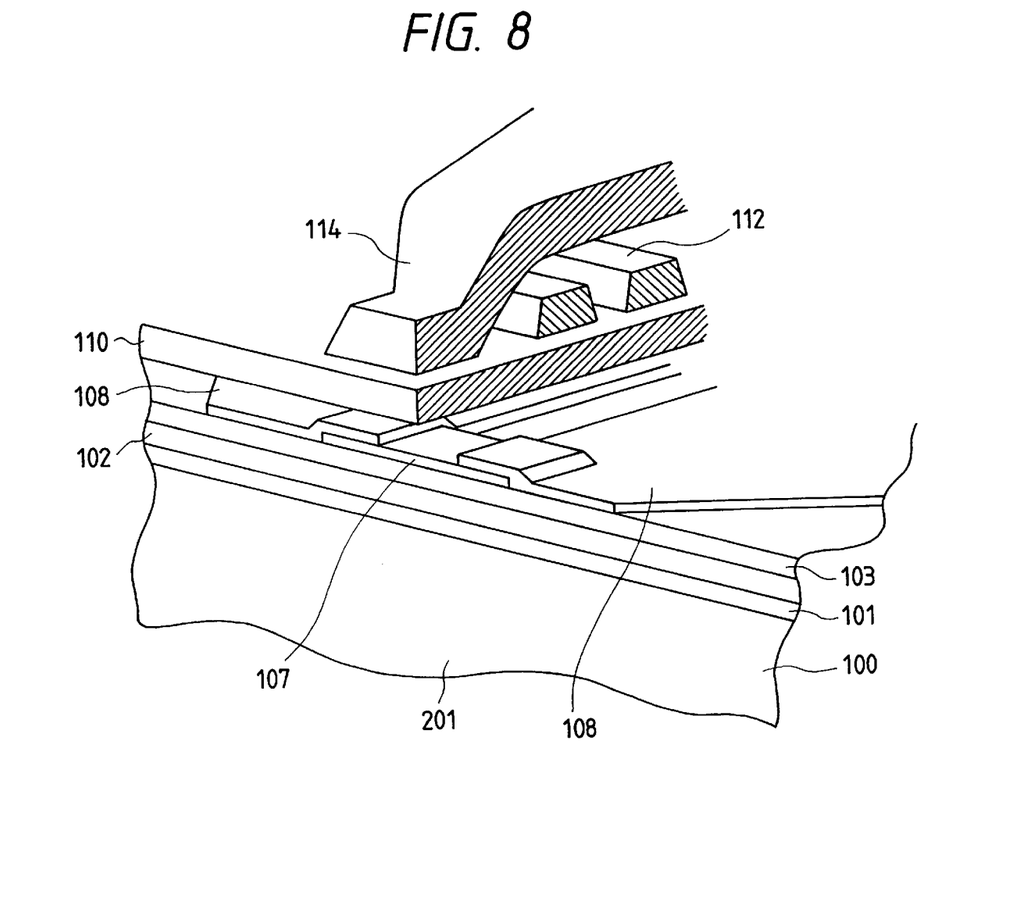
FIG. 8 is a schematic enlarged partial perspective view of the MR head with the recording head element as shown in FIG. 7.

FIG. 7 is a schematic partial sectional view of the MR head with the recording head element, and FIG. 8 is a schematic enlarged partial perspective view of the MR head with the recording head element as shown in FIG. 7.

In FIGS. 7 and 8, numeral 100 denotes a substrate formed of a ceramic material, such as, Al$_2$O$_3$TiC or Mn—Zn ferrite. A film forming surface of the substrate 100 is a mirror finished surface having a roughness of equal to or less than several tens of angstroms (Å). Numeral 101 denotes an insulating film or layer formed of Si or diamond-like carbon as the insulating layer 51 in the first preferred embodiment and disposed on the film forming surface of the substrate 100. The insulating layer 101 is mirror-finished so as to have a thickness of several micrometers (μm). Numeral 102 denotes a shield film or layer provided on the mirror finished surface of the insulating layer 101. The shield layer 102 is formed of a soft magnetic material, such as, Sendust or permalloy, having a thickness of about 1 μm to 5 μm. When the shield layer 102 is formed of Sendust, the sputtering is performed. On the other hand, when the shield layer 102 is formed of permalloy, the plating is performed. Numeral 103 denotes an insulating film or layer formed of Si or diamond-like carbon as the insulating layer 53 in the first preferred embodiment and disposed on the shield layer 102. The insulating layer 103 has a thickness of about 1000 Å to 3000 Å. Numeral 104 denotes a bias film or layer formed on the insulating layer 103. The bias layer 104 is formed of a soft magnetic material, such as, CoZrMo amorphous alloy or NiFeRh alloy, having a thickness of about 200 Å to 500 Å. Numeral 105 denotes a spacer film or layer formed on the bias layer 104. The spacer layer 105 is formed of, such as, SiO$_2$, Ti or Ta, having a thickness of about 100 Å to 300 Å. Numeral 106 denotes a magnetoresistive film or layer formed on the spacer layer 105. The magnetoresistive layer 106 is formed of a material showing a magnetoresistance effect, such as, Ni—Fe, having a thickness of about 200 Å to 500 Å. The magnetoresistive layer 106 is formed by the sputtering in a magnetic field of about 50 Oe to 200 Oe. The bias layer 104, the spacer layer 105 and the magnetoresistive layer 106 constitute a reproducing section 107 of the MR head which corresponds to the MR element layer 54 in the first preferred embodiment. Numerals 108, 108 denote a pair of lead films or layers provided on the reproducing section 107 and the insulating layer 103 and being separate from each other, i.e. being out of contact with each other. The lead layers 108, 108 each have a three-layered structure as the lead layers 55, 56 in the first preferred embodiment. The conductive lead layer of each lead layer 108 is formed of, such as, gold or tungsten, and each lead layer 108 has a thickness of about 1500 Å to 3000 Å (antiferromagnetic bias layer: 300 Å, adhesion strengthening layer: 100 Å, conductive lead layer: 1100 Å to 2600 Å). Numeral 109 denotes an insulating film or layer provided as covering the reproducing section 107 and the lead layers 108, 108. The insulating layer 109 is formed of Si or diamond-like carbon as the insulating layer 57 in the first preferred embodiment. Numeral 110 denotes a shield film or layer provided on the insulating layer 109. A material of and a forming method of the shield layer 110 are substantially the same as those of the shield layer 102. Numeral 111 denotes a gap film or layer formed on the shield layer 110. The gap film 111 works as a magnetic gap and is formed by applying the sputtering to a nonmagnetic material, such as, SiO$_2$. Numeral 112 denotes a coil film or layer provided on the gap film 111. The coil film 112 is formed of a conductive material, such as, copper or gold by performing the plating. Numeral 113 denotes a layer insulating film or layer provided as covering the coil film 112. The layer insulating film 113 is formed of, such as, a photoresist. Numeral 114 denotes an upper core provided on the layer insulating film 113 for forming a magnetic circuit with the shield film 110 so as to provide the recording head element. The upper core 114 is formed of a soft magnetic material, such as, permalloy or Sendust. Numeral 115 denotes a protective film or layer provided on the upper core 114. The protective film 115 is formed of a material, such as, SiO$_2$.

Each of the insulating layers 101, 103 and 109 satisfies the following conditions as in the first preferred embodiment.

Electrical Resistivity>1×10$^4$ Ωcm

Thermal Conductivity>100 W/(mK)

As in the first preferred embodiment, it may be arranged that at least one of the insulating layers 103 and 109 satisfies these conditions.

The substrate 50, the insulating layer 51, the shield layer 52, the insulating layer 53, the MR element layer 54, the lead layers 55, 56, the insulating layer 57 and the shield layer 58 in FIG. 1 correspond to the substrate 100, the insulating layer 101, the shield layer 102, the insulating layer 103, the reproducing section 107, the lead layers 108, 108, the insulating layer 109 and the shield layer 110 in FIG. 7, respectively, and may be formed substantially identical with the corresponding layers in FIG. 7, respectively.

It is to be understood that this invention is not to be limited to the preferred embodiments and modifications described above, and that various changes and modifications may be made without departing from the spirit and scope of the invention as defined in the appended claims.

For example, the materials forming the insulating layers in the first and second preferred embodiments are not limited to Si and diamond-like carbon. Other materials may be used for forming the insulating layers as long as those materials satisfy the foregoing conditions of the electrical resistivity and the thermal conductivity.

What is claimed is:

1. A magnetoresistive thin film head comprising:

a substrate;

a first shield layer;

a first insulating layer disposed on said first shield layer, said first shield layer disposed between said substrate and said first insulating;

a magnetoresistive element film disposed on said first insulating layer;

lead layers disposed on said first insulating layer for supplying a sense current to said magnetoresistive element film;

a second insulating layer disposed on said first insulating layer so as to cover said magnetoresistive element film; and a second shield layer disposed on said second insulating layer, wherein each of said first and second insulating layer is formed of a material which has an electrical resistivity greater than $1 \times 10^4$ $\Omega$cm and a thermal conductivity greater than 100 W/(mK).

2. The magnetoresistive thin film head as set forth in claim 1, wherein said material of each of the first and second insulating layers is silicon.

3. The magnetoresistive thin film head as set forth in claim 1, wherein said material of each of the first and second insulating layers is diamond-like carbon.

4. The magnetoresistive thin film head as set forth in claim 1, wherein a recording element section is provided for recording data on a magnetic recording medium.

5. The magnetoresistive thin film head as set forth in claim 4, wherein said recording element section includes said second shield layer as a portion forming said recording element section.

6. The magnetoresistive thin film head as set forth in claim 1, further comprising a gap layer provided on said second shield layer, an upper core provided on said gap layer so as to form a magnetic circuit with said second shield layer, and a coil layer provided between said second shield layer and said upper core for supplying a magnetic flux to said second shield layer and said upper core.

7. The magnetoresistive thin film head as set forth in claim 6, wherein said material of each of the first and second insulating layers is silicon.

8. The magnetoresistive thin film head as set forth in claim 6, wherein said material of each of the first and second insulating layers is diamond-like carbon.

9. The magnetoresistive thin film head of claim 1 wherein said magnetoresistive element has a width approximating a height of said magnetoresistive element.

\* \* \* \* \*